United States Patent Office 3,236,920
Patented Feb. 22, 1966

3,236,920
TRIHALOETHYL PHOSPHATES
Benjamin Arthur Hems, Ickenham, Middlesex, Vincent Arkley, Pinner, Middlesex, Gordon Ian Gregory, Chalfont St. Peter, Godfrey Basil Webb, Greenford, Middlesex, Joseph Elks, London, and Edward George Tomich, Harrow, Middlesex, England, assignors to Glaxo Laboratories Limited, Greenford, England, a British company
No Drawing. Filed Oct. 2, 1962, Ser. No. 227,730
Claims priority, application Great Britain, Oct. 5, 1961, 35,934/61
5 Claims. (Cl. 260—963)

This invention is concerned with novel chemical compounds having useful hypnotic properties.

Trichloro-ethanol ($CCl_3CH_2OH$) is known to have useful hypnotic properties but suffers from the disadvantage of possessing a very bitter taste, which presents problems in administration, particularly to children. Tribromoethanol has similar properties.

We have now found that partial esters of these trihalogeno ethanols with certain di- and poly-basic acids possess a number of important advantages as compared with the parent alcohols. It is found as demonstrated by controlled animal tests that the onset of the hypnotic effect is not so rapid with the esters as in the parent alcohol, but in the case, for example of trichloroethyl orthophosphate, the effect is more prolonged, thus enabling a more controlled degree of sedation to be obtained. In particular, the partial esters have little or none of the bitterness of the parent alcohols and in the salt form have a pharmaceutically acceptable taste. The free acids, are naturally, sour in taste but may readily be formulated with substances which neutralise the acid on oral administration or dissolution in water. In addition to their improved taste characteristics, the salts of the said esters also have less tendency than the parent alcohols to cause nausea or gastric irritation on oral administration.

Accordingly, the invention provides new hypnotic compounds, namely acidic esters of the general formula $$CX_3 \cdot CH_2—O—R$$

in which R is a group of the formula

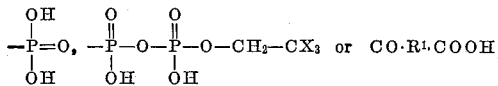

where X is a chlorine or bromine atom and $R^1$ is the residue of a non-toxic di- or poly-basic carboxylic acid

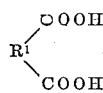

and non-toxic salts of said esters with metals, ammonia and organic bases, particularly alkali metal, e.g. sodium, and alkaline earth metal salts. By the term "polybasic acid" we mean an acid having at least three acidic groups.

The new esters according to the invention further possess the advantage of good water-solubility in the form of their alkali metal e.g. sodium salts. Other useful salts of the new acidic esters include lithium, potassium, calcium, magnesium, aluminium, ammonium, diethanolamine and procaine salts.

The di- or polybasic organic acids $R^1(COOH)_2$ may for example, be aliphatic di- or polycarboxylic acids, e.g. succinic acid or aromatic di- or polycarboxylic acids, e.g. phthalic acid. In the case of the organic poly-basic acids the grouping $R^1$ carries one or more further carboxyl groups and in general $R^1$ may carry further substituents such as esterified carboxyl groups; thus, for example, such esters may be mixed esters from the trihalogeno ethanol and some other alcohol. Naturally, since the acid is eventually liberated by hydrolysis after administration, the free acid should not itself be toxic in the doses used.

Particularly preferred compounds according to the invention having regard to their favourable pharmocological properties and their good stability are the primary esters formed from orthophosphoric acid and the symmetrical pyrophosphoric acid diesters and their salts. Thus particularly good results may be obtained with trichloroethyl orthophosphate which compound may be conveniently presented as an alkali metal or alkaline earth metal salt, preferably the sodium or calcium salt.

We have found however that monosodium trichloroethyl hydrogen phosphate has the advantage as compared with the disodium salt of lower hygroscopicity which gives rise to greater ease in pharmaceutical presentation. The calcium salt is also advantageous having if anything somewhat improved taste characteristics as compared with the sodium salts.

Thus particularly preferred compounds according to the invention are monosodium trichloroethyl hydrogen phosphate and calcium trichloroethyl phosphate.

The new compounds according to the invention may be prepared from the parent alcohol by conventional methods of esterification, the exact procedure of course depending upon the nature of the ester to be prepared. Organic esters may be prepared in principle using the acid or an esterifying derivative thereof, e.g. the anhydride. The phosphate esters may be prepared by general methods of phosphorylation.

According to the present invention we provide a process for the preparation of the acidic esters of general Formula I in which a $\beta,\beta,\beta$-trihalogenoethanol of the general formula $$CX_3CH_2OH$$

(where X has the meanings given above) is esterified with a di- or poly-carboxylic acid $R^1(COOH)_2$ or a functional derivative thereof or is phosphorylated, the resultant acid ester of general Formula I being if desired converted to a non-toxic metal, ammonium or organic base salt thereof.

The ortho-phosphates may, for example, be prepared by reacting the parent trihalogeno ethanol with phosphorus oxychloride or phosphorus oxybromide to form a trihalogenoethyl phosphorodihaloidate, the unreacted halogen atoms on the phosphorus atom of which are subsequently hydrolysed to hydroxyl groups.

The reaction of the parent alcohol with the phosphorus oxyhalide is preferably carried out in the presence of an acid binding agent, suitable acid binding agents being tertiary organic bases such as pyridine, dimethylaniline, quinoline, collidine, picoline and N-methyl morpholine. The reaction is also preferably carried out in the presence of an inert organic solvent for example an ether solvent such as diethyl ether or tetrahydrofuran or an aromatic hydrocarbon solvent such as benzene, toluene, xylene, etc. The solvent should be anhydrous. The reaction conveniently takes place at temperatures of from —20° to +40° C., temperatures of from —10° to +25° C. being preferred. Thus for example the reaction may be effected by allowing a solution of the reaction components to stand at 15° C. until completion which may require some 12 hours.

The hydrolysis of the phosphorodihaloidate may be effected with water or with aqueous acid or alkali. The use of water alone or aqueous weak alkali is preferred, a suitable alkaline hydrolysis medium being an aqueous alkali metal carbonate e.g. aqueous sodium or potassium carbonate, conveniently at a strength of from 0.01 N up to a saturated solution. Whilst as stated hydrolysis is preferably effected with water or weak alkali, aqueous acids such as aqueous hydrochloric or sulphuric acid and aqueous strong alkalis such as aqueous soda, potash or ammonia can be used, but care should be taken to avoid hydrolysis of the halogen atoms on the alcohol moiety. Using alkali, for example, the hydrolysis may be initiated at room temperature, the temperature rising spontaneously as the reaction proceeds. Using water the hydrolysis is conveniently effected by heating to about 50° C.

The resultant phosphate ester is conveniently recovered by extraction as the acid with a solvent such as ether or a tetrahydrofuran/chloroform mixture and converted into any desired salt thereof as required. Where alkaline hydrolysis is used the phosphate ester may of course be recovered directly as an alkali metal salt.

The trichloroethyl orthophosphate may also be prepared by reacting the parent trihalogeno ethanol with a di(arylmethyl) phosphorohaloidate e.g. dibenzyl phosphorochloridate followed by removal of the protecting arylmethyl groups by hydrogenolysis e.g. with hydrogen in the presence of a palladium catalyst, e.g. palladised charcoal.

The trihalogenoethyl orthophosphates may be prepared by reacting the trihalogenoethanol with a linear polyphosphoric acid, conveniently tetraphosphoric acid. Commercial tetraphosphoric acid is satisfactory for the reaction and comprises tetraphosphoric acid as well as other polyphosphoric acids of different degrees of condensation. The reaction is conveniently effected in the absence of a solvent. Whilst reaction takes place in the absence of applied heat preferably elevated temperatures are used e.g. temperatures of 80–110° C. The trihalogenoethanol is preferably used in an amount of 1–4 mols based on the tetraphosphoric acid. The progress of the reaction can be followed by titration of liberated acid groups and particularly free phosphoric acid.

The following two methods can be used for the recovery of the phosphate ester so produced.

(a) Dilution with water and extraction with a solvent such as ether, which extracts trihalogenoethyl dihydrogen phosphate and leaves most of the inorganic phosphoric acid in the aqueous layer. The free acid obtained by evaporation and, if necessary, crystallisation, can be converted into any desired salt.

(b) Dilution with water, neutralisation to pH 3.75 with alkali e.g. sodium hydroxide in order to convert both trihalogenoethyl dihydrogen phosphate and phosphoric acid into their mono-sodium salts, evaporation and extraction of the solid with methanol, in which only the organic phosphate has reasonable solubility. In this way sodium trihalogenoethyl hydrogen phosphate is obtained directly, but this could be converted into any other salt by standard methods.

Pyrophosphates may be prepared by condensing two molecules of the corresponding orthophosphate ester for example in the presence of a carbodiimide e.g. dicylcohexyl-carbodiimide or cyanamide or a mono- or dialkyl cyanamide as condensing agent. The reaction is preferably conducted in the presence of a tertiary organic base e.g. tributylamine or pyridine. The reaction is further preferably conducted in an inert organic solvent.

Esters of di- or polycarboxylic acids may, for example, be prepared by reacting the parent alcohol with the anhydride of the acid, e.g. phthalic or succinic anhydride, preferably in excess, generally in the presence of a tertiary organic base, e.g. pyridine, triethylamine, dimethylaniline etc.

In general salts of the esters according to the invention may be prepared by neutralisation thereof with the appropriate base or by metathesis from another salt.

For example, the monosodium hydrogen phosphate salts according to the invention are conveniently prepared from the free acids by partial neutralisation to pH 3.75–4.05, and the disodium salts by neutralisation to pH 9–10. The calcium salts are preferably prepared by metathesis e.g. by adding an aqueous solution of calcium chloride to an aqueous solution of a disodium salt.

The new acidic partial esters according to the invention may be formulated for administration in conventional manner with the aid of suitable pharmaceutical carriers or excipients. Preparations for oral or rectal administration are of particular convenience. For administration to adults suitable preparations are those in solid form, particularly in the form of dosage units each dosage unit containing a sufficient amount of the active ingredient to provide a single dose. The content of active ingredient in each dosage unit may thus be from 100 mg. to 2 gm. e.g. 200–750 mg. Suitable dosage unit presentations include tablets, capsules, pills, dragees, suppositories, rectal capsules etc. Tablets intended for swallowing may, for example, contain from 100–750 mg. of active ingredient whilst effervescent tablets may contain for example, up to 2 gm. of active ingredient. The compositions preferably contain 5% to 99% by weight of active ingredient.

For administration particularly to children the new compounds may also be formulated in liquid form adapted for oral administration e.g. in the forms of syrups, elixirs, suspensions, drops, etc. A suitable concentration in such liquid preparations is for example from 3 to 75% by weight.

Solid preparations for oral administration may be formulated as desired. Thus in the preparation of tablets, pills or dragees one may include diluents such as lactose, glycine, sorbitol etc. bonding agents such as polyethylene glycol, polyvinylpyrrolidone, gelatine, disintegrating agents such as starch, finely divided silica, alginic acid and lubricants such as magnesium stearate, talc, liquid paraffin, sodium benzoate. Suppositories may comprise the active ingredient dispersed in a suppository base, e.g. containing glyceryl esters of lauric acid with a small percentage of glyceryl mono-stearate. The rectal capsules may contain the active ingredient with an ointment base in a gelatine capsule.

Oral liquid preparations may be prepared with an aqueous or oily base and may include any desired taste and/or flavouring agents, sweetening agents, wetting and/or suspending agents and/or preservatives and/or stabilising agents.

For the better understanding of the invention the following examples are given by way of illustration only. The temperatures are in degrees centigrade.

EXAMPLE 1

Trichloroethanol (500 g.) and phosphorus oxychloride (510 g.) were added to dry diethyl ether (3.5 l.) and stirred at 10° with ice/water cooling. Dry pyridine (270 ml.) was added dropwise over 1 hr., maintaining the temperature below 25°. The resulting suspension was stirred for a further 1 hr. and then stood at 0° overnight. The pyridine hydrochloride was removed by filtration and washed with diethyl ether (2 x 300 ml.) and dried in vacuo over $P_2O_5$ to give 380 g.

The ether filtrate and washings were evaporated at room temperature under reduced pressure to give a clear liquid residue (801 g.).

This residue was distilled under high vacuum to give trichloroethyl phosphorodichloridate (556 g., 62.4% of theory), B.P. 75°/0.8 mm.

The phosphorodichloridate was hydrolysed by adding to a stirred solution of sodium carbonate (253 g.) in water (2.9 l.). After 1 hr. the solution was cooled and acidified with a solution of concentrated sulphuric acid (30 ml.) in water (150 ml.), and then extracted with a mixture of tetrahydrofuran and chloroform (2.3/1; 3 x 1 l.). The tetrahydrofuran/chloroform liquors were bulked and evaporated to dryness to give a light brown oil. This was dissolved in water (1 l.) and titrated with 2 N sodium hydroxide solution to a pH of 4.05 (vol. required 930 ml.). The aqueous solution was clarified by filtration through kieselguhr and then evaporated under reduced pressure to a syrup (737 g.).

Hot acetone (4.5 l.) was added to this syrup and the clear solution stood at room temperature for 2 hr. and then at 0° overnight. The white crystalline solid was filtered off, washed with acetone (2 x 400 ml.) and dried at 60° in vacuo to give sodium trichloroethyl hydrogen phosphate (414 g., 49.3% of theory from trichloroethanol).

EXAMPLE 2

A mixture of commercial tetraphosphoric acid (46.5 g.) and trichloroethanol (56.8 g.) was stirred and heated in an oil bath at 100–105° for 6 hours. The mixture, which solidified on cooling, was dissolved in water (100 ml.) and the pH adjusted to 3.8 with 2 N sodium hydroxide solution. The solution was extracted with benzene and the aqueous phase evaporated to dryness. The residue was digested with boiling methanol (500 ml.) for 1 hr. and then cooled overnight in a refrigerator. The inorganic phosphate was filtered off and the filtrate was evaporated to dryness to give the crude sodium trichloroethyl hydrogen phosphate (79.4 g.). The crude salt was dissolved in water (39 ml.) and acetone (1,200 ml.) was added. The clear solution rapidly deposited sodium trichloroethyl hydrogen phosphate as small plates (57.2 g.; 60%). M. wt. by titration 248, theory 251.5. Addition of aqueous sodium hydroxide to an aqueous solution of the compound to pH 9.5 followed by evaporation gave the disodium salt which could be recrystallised from aqueous ethanol.

EXAMPLE 3

A mixture of tetraphosphoric acid (43.5 g.) and trichloroethanol (58.0 g.) was stirred at room temperature for 4 hr. and then at 100° for 3 hr. A sample (14.2 g.) of the cooled reaction mixture was dissolved in ether (35 ml.) and washed with water (10 ml.). The water wash was extracted with ether (10 ml.) and the combined ether extracts dried ($MgSO_4$) and evaporated, finally in high vacuum, to a sticky solid (ca. 11 g.). This residue was triturated with benzene when the crude acid separated as white plates (6.4 g.), M.P. 105–114°. Recrystallisation from nitromethane (25 ml.) gave pure trichloroethyl dihydrogen phosphate (5.15 g.), M.P. 121–123° (about 40% yield).

EXAMPLE 4

A solution of disodium trichloroethyl phosphate (96 g.) in water (400 ml.) was acidified with a solution of concentrated sulphuric acid (26 ml.) in water (100 ml.). The clear solution was extracted with a mixture of tetrahydrofuran and chloroform (2.3:1; 3 x 220 ml.). The extracts were bulked and evaporated to dryness under reduced pressure, and the trichloroethyl dihydrogen phosphate dissolved in water (200 ml.).

Using a pH meter, this solution of the phosphate was titrated against a solution of disodium trichloroethyl phosphate (92 g.) in water (380 ml.), to a pH of 4.05. This required a volume of 368 ml.=89 g. disodium salt.

The solution at pH 4.05 contained 163.4 g. monosodium salt. This was filtered through kieselguhr for clarification and then evaporated under reduced pressure to a thick syrup, wt.: 262 g. Hot acetone (1.5 l.) was added to this syrup and the clear solution stood at room temperature until crystallisation occurred and then at 0° overnight.

The white crystalline material was collected by filtration, washed with acetone (2 x 100 ml.) and dried at 60° in vacuo to give sodium trichloroethyl hydrogen phosphate (132 g.). Found: Na, 9.13%; P, 12.75%; Cl, 42.6%. $C_2H_3O_4Cl_3PNa$ requires Na, 9.15%; P, 12.35%; Cl, 42.3%.

EXAMPLE 5

*Preparation of calcium salt of trichloroethyl phosphate*

To a solution of disodium trichloroethyl phosphate (12 g.) in water (100 ml.), a solution of calcium chloride hexahydrate (10 g.) in water (150 ml.) is added. The precipitated calcium salt is filtered off, washed thoroughly with water and dried at 100° in vacuo (11 g.). (Found: C, 8.4; H, 1.44; Cl, 37.2; P, 11.3; Ca, 13.52%. $C_2H_2Cl_3O_4P \cdot Ca \cdot H_2O$ requires C, 8.4; H, 1.4; Cl, 37.35; P, 10.8; Ca, 14.0%.)

EXAMPLE 6

(a) *Trichloroethyl dibenzyl phosphate*

Dibenzyl phosphite (30 g.) was dissolved in carbon tetrachloride (150 ml.) and stirred at room temperature under nitrogen. Sulphuryl chloride (10 ml.) was added dropwise, during 10 min. with cooling, and the mixture was rapidly stirred in a stream of nitrogen for 2 hr. The solvent was removed in vacuo at room temperature and the resulting dibenzyl phosphorochloridate was added slowly to a stirred suspension of trichloroethanol (10 g.) in 20% sodium hydroxide solution (200 ml.). The mixture was stirred for 1 hr. at room temperature and extracted with ether (2 x 250 ml.). The extract was washed with water (2 x 100 ml.) and the solvent removed. The crude trichloroethyl dibenzyl phosphate (27.2 g.) was not purified.

(b) *Trichloroethyl disodium phosphate*

Trichloroethyl dibenzyl phosphate (25 g.) was dissolved in ethanol (500 ml.) and shaken with hydrogen in presence of 5% palladised charcoal (2.5 g.). After 10 min. at room temperature and pressure, hydrogenation ceased. The solution was filtered, neutralised to pH 7 with sodium hydroxide and evaporated to low bulk in vacuo. Addition of a large volume of acetone caused trichloroethyl disodium phosphate to crystallise (4.76 g.). This was recrystallised from ethanol-aqueous acetone, to give 4.0 g. of material with M.P. 300° (decomp.). (Found: C, 8.6; H, 1.3; P, 11.4; Cl, 39.7. $C_2H_2Cl_3Na_2O_4P$ requires C, 8.8; H, 0.74; P, 11.3; Cl, 38.9%.)

EXAMPLE 7

*Trichloroethyl hydrogen succinate*

A mixture of trichloroethanol (25 g.), succinic anhydride (40 g.) and dry pyridine (100 ml.) was heated for 1 hr. on a steam bath. Most of the pyridine was removed under reduced pressure and the oily residue poured on to a mixture of hydrochloric acid (2 N:250 ml.) and ice with stirring. The precipitated gum soon solidified and was collected, washed with water and dried (38.0 g., M.P. 80–82°). The crude product was crystallised from cyclohexane (ca. 500 ml.) to give pure trichloroethyl hydrogen succinate (30.7 g.), M.P. 88–90°. (Found: C, 29.4; H, 2.8; Cl, 42.4. $C_6H_7Cl_3O_4$ requires C, 29.0; H, 2.8; Cl, 42.8%.)

The acid (2 g.) in a mixture of ethanol (30 ml.) and water (30 ml.) was titrated with sodium hydroxide solution (0.25 N) to pH 8.6. The solution was evaporated under reduced pressure and the residue of sodium trichloroethyl succinate dried over phosphorus pentoxide.

EXAMPLE 8

*Tribromoethyl dihydrogen phosphate*

Freshly distilled phosphorus oxychloride (3.66 ml., 6.13 g., 0.04 mol.) was added to a stirred solution of tribromoethanol (11.3 g., 0.04 mol.) in anhydrous ether (100 ml.) at −10°. Pyridine (3.22 ml., 3.16 g., 0.04 mol.) was added dropwise at −10° causing an immediate flocculent precipitate which was filtered off and washed with dry ether, after a further ¼ hr. at −10°. During the filtration more solid was separating and the filtrate was allowed to warm to room temperature for ½ hr. and the precipitate collected similarly. The combined precipitates (6.56 g.), when treated with water, gave an oil which soon solidified (2.02 g.) M.P. 74–9° and was shown to be tribromoethanol by mixed M.P. and I.R. spectroscopy. The filtrate was kept for a further 2 hr. in the refrigerator during which time it darkened somewhat and a little yellow gum separated. Most of the ether was evaporated under reduced pressure at below room temperature and the residue was added to excess sodium carbonate solution (about 200 ml. of N) with stirring. The clear solution was extracted with ether and the aqueous layer was acidified with hydrochloric acid and extracted with ether. Evaporation of the dried ether extract gave the crude phosphate (1.81 g.), M.P. 128–142°. Crystallisation from chloroform gave tribromoethyl dihydrogen phosphate (0.77 g.), M.P. 147–150°.

The acid (0.77 g.) in a mixture of ethanol (20 ml.) and water (10 ml.) was titrated potentiometrically against N/10 sodium hydroxide solution showing inflections at pH 3.8 (21.2 ml.) and pH 9.8 (41.5 ml.). The solution was evaporated to dryness on a rotary evaporator and the residue crystallised from ethanol to give needles of disodium tribromoethyl phosphate (0.48 g.). (Found: C, 5.6; H, 1.2; Br, 58.8. $C_2H_2Br_3O_4Na_2P$ requires C, 5.9; H, 0.5; Br, 58.95%.)

EXAMPLE 9

*Tribromoethyl hydrogen succinate*

A mixture of tribromoethanol (5 g.), succinic anhydride (2.65 g.) and dry pyridine (25 ml.) was heated on the water bath for 1 hr. The solution, which had darkened slightly, was poured into N-hydrochloric acid (350 ml.) with vigorous stirring. The crude product was collected (5.46 g., M.P. 112–115°) and crystallised from boiling cyclohexane containing a little benzene, giving plates (4.68 g.), M.P. 115–116°. Recrystallisation of a sample from isopropanol gave material with M.P. 117–119°. (Found: C, 19.15; H, 1.9; Br, 62.45. $C_6H_7O_4Br_3$ requires C, 18.8; H, 1.85; Br, 62.6%.)

EXAMPLE 10

*Lithium trichloroethyl hydrogen phosphate*

Trichloroethyl dihydrogen phosphate (10 g.) was titrated to pH 3.7 with approximately 2 N lithium hydroxide solution (23.5 ml.). The solution was filtered through a pad of kieselguhr, the filtrate was evaporated to dryness on a rotary evaporator and the residual solid dried over $P_2O_5$ (10.84 g.). A sample was dried at 80° in vacuo for analysis. (Found: C, 10.15; H, 1.85. $C_2H_3Cl_3O_4PLi$ requires C, 10.21; H, 1.3%.)

EXAMPLE 11

*Dilithium trichloroethyl phosphate*

Trichloroethyl dihydrogen phosphate (10 g.) in water (ca. 50 ml.) was titrated with approximately N lithium hydroxide solution to the 2nd inflection. The product (11.15 g.), isolated as in the previous example, was crystallised from a mixture of water (70 ml.) and acetone (50 ml.) (recovery 63%). [Found (in sample dried at 60° in vacuo): C, 9.7; H, 1.4; Cl., 43.1.

$C_2H_2Cl_3O_4PLi_2 \cdot \tfrac{1}{2}H_2O$ requires C, 9.6; H, 1.2; Cl, 42.6%.]

EXAMPLE 12

*Potassium trichloroethyl hydrogen phosphate*

Trichloroethyl dihydrogen phosphate (10 g.) in water (ca. 50 ml.) was titrated to pH 4.0 with approximately 2 N potassium hydroxide solution. The product (11.5 g.), isolated in the usual way, was crystallised from methanol/ethanol in two crops (3.8 g. and 4.4 g.). (Found: C, 9.3; H, 1.0; Cl, 39.5; P, 11.4; K, 14.5. $C_2H_3Cl_3O_4PK$ requires C, 8.95; H, 1.1; Cl, 39.8; P, 11.55; K, 14.55%.)

EXAMPLE 13

*Dipotassium trichloroethyl phosphate*

Trichloroethyl dihydrogen phosphate (10 g.) in water (ca. 50 ml.) was titrated to the 2nd inflection with approximately 2 N potassium hydroxide solution. The product was isolated in the usual way and was crystallised from methanol (50 ml.) and acetone (70 ml.) and dried over phosphorus pentoxide; 10.7 g. (Found [loss at 60°, 6.8%): Cl, 34.6; P, 10.0; K, 24.9 (calculated to dry weight). $C_2H_2Cl_3O_4PK_2$ requires Cl, 34.8; P, 10.15; K, 25.6%.)

EXAMPLE 14

*Magnesium trichloroethyl hydrogen phosphate*

Trichloroethyl dihydrogen phosphate (10 g.) in water (50 ml.) was stirred magnetically and magnesium hydroxide (1.3 g.) was added gradually. The base soon dissolved and a little more was added to pH 3.5. The filtered solution was evaporated to dryness (11.17 g.). A sample was dried in vacuo at 80° for analysis. (Found: C, 9.45; H, 1.95; Cl, 41.1. $C_4H_6Cl_6O_8P_2Mg \cdot 2H_2O$ requires C, 9.3; H, 1.95; Cl, 41.1%.)

EXAMPLE 15

*Neutral magnesium salt of trichloroethyl dihydrogen phosphate*

Sodium trichloroethyl hydrogen phosphate (5.04 g.) in water (20 ml.) was titrated to pH 9.8 with normal sodium hydroxide solution (19.9 ml.) and heated to 70–80° during the addition of a solution of hydrated magnesium sulphate (4.93 g.) in water (20 ml.). The heavy precipitate was collected, washed with water and dried over phosphorus pentoxide. (Found: Cl, 38.25; Mg, 8.8; P, 10.9. $C_2H_2Cl_3O_4PMg \cdot 1\tfrac{1}{2}H_2O$ requires Cl, 38.2; Mg, 8.7; P, 11.1%.)

EXAMPLE 16

*Aluminium trichloroethyl phosphate*

Disodium trichloroethyl phosphate (11.2 g.) in water (100 ml.) was treated with a solution of aluminium sulphate $16H_2O$ (7.7 g.) in water (75 ml.). The precipitate (8.5 g.) was collected; the filtrate gave no further precipitate when treated with more aluminium sulphate solution. (Found: C, 8.85; H, 2.2; Cl, 39.6.

$C_6H_6O_{12}Cl_9P_3Al_2 \cdot 4H_2O$ requires C, 8.9; H, 1.75; Cl, 39.5%.)

EXAMPLE 17

*Ammonium trichloroethyl hydrogen phosphate*

Trichloroethyl dihydrogen phosphate (10 g.) in water (50 ml.) was titrated to pH 3.8 with approximately 2 N ammonium hydroxide. The solution was filtered and evaporated to dryness, finally in high vacuum: 10.55 g., M.P. 176° (dec.). (Found: C, 9.9; H, 2.65; Cl, 43.3; N, 5.6; P, 12.5. $C_2H_7Cl_3O_4NP$ requires C, 9.75; H, 2.85; Cl, 43.15; N, 5.7; P, 12.55%.)

EXAMPLE 18

*Diethanolamine trichloroethyl hydrogen phosphate*

Trichloroethyl dihydrogen phosphate (1 g.) in ethyl acetate (20 ml.) was added to a solution of diethanolamine (0.46 g.) in acetone (20 ml.), when a gum precipitated. The solvents were removed under reduced pressure and the residual gum crystallised from isobutanol; 0.50 g., M.P. 60–63°. (Found: C, 22.5; H, 4.85; Cl, 29.55; N, 4.3. $C_6H_{15}Cl_3O_6NP$ requires C, 21.5; H, 4.5; Cl, 31.9; N, 4.3%.)

EXAMPLE 19

*Procaine trichloroethyl hydrogen phosphate*

Trichloroethyl dihydrogen phosphate (1.0 g.) in ethyl acetate (20 ml.) was mixed with a solution of procaine (1.02 g.) in ethyl acetate (30 ml.). An oil precipitated immediately, and the solvent was evaporated and the residue triturated with ether, when it solidified. The salt was crystallised from water. (Found: C, 37.55; H, 5.45; Cl, 21.3; N, 5.45. $C_{15}H_{24}Cl_3N_2O_6P \cdot H_2O$ requires C, 37.3; H, 5.4; Cl, 22.0; N, 5.3%.)

EXAMPLE 20

*Disodium $P^1,P^2$-bis-(trichloroethyl)pyrophosphate*

A solution of dicyclohexylcarbodiimide (2.26 g., 0.011 mole) in dry tetrahydrofuran (20 ml.) was added to a solution of trichloroethyldihydrogen phosphate (4.6 g., 0.02 mole) in dry tetrahydrofuran (30 ml.). The addition of dry pyridine (4.0 ml; 0.05 mole) caused rapid separation of dicyclohexylurea; after being kept for 2 hr. at room temperature the mixture was filtered and the filtrate evaporated under reduced pressure. The residue was dissolved in water (50 ml.) filtered and titrated with N-sodium hydroxide solution to pH 8.0. The solution was evaporated to dryness and the residue crystallised from ethanol (ca. 50 ml.) gave needles of disodium $P^1,P^2$-bis - (trichloroethyl)pyrophosphate (4.38 g.). Found: Equivalent weight 245 (theory 242.5).

The following examples of suitable formulations are given by way of illustration only:

EXAMPLE 21

*Tablets for oral use, showing rapid solution*

|   | Mg. |
|---|---|
| Trichloroethyl monosodium phosphate (TEP) | 250.0 |
| Polyethylene glycol 6,000 (PEG 6000) | 12.0 |
| Magnesium stearate | 2.5 |
|   | 264.5 |

*Method.*—Pass the TEP through a 60 mesh screen and granulate with the PEG 6,000 dissolved in chloroform or ethanol. Force the granules through a 12 mesh screen and dry at 40° C. Pass the dried granules through a 16 mesh screen. Evenly disperse the magnesium stearate onto the granules as lubricant, prior to compression. Compress on a standard tabletting machine.

EXAMPLE 22

*Oral syrup*

|   | Mg. |
|---|---|
| Trichloroethyl-phosphate, disodium salt | 500 |
| Sucrose | 1312 |
| Liquid glucose | 1313 |
| Nipa Combination 82121 (combination of methyl, propyl and other esters of parahydroxy benzoic acid, as supplied by Nipa Laboratories Ltd., Treforest Industrial Estate, Pontypridd, Glamorganshire) | 0.0035 |
| Sodium cyclamate | 11.5 |
| Bush rum flavour | 0.07 |
| Water to produce 3.5 ml. |   |

*Method.*—Dissolve the sugar in an approximately equal volume of water with the aid of heat and boil for 5 minutes. Add the Nipa Combination 82121 to the boiling solution and stir until dissolved. Add the liquid glucose to the syrup and boil for a further 5 minutes, allow to cool and add the trichloroethyl phosphate disodium salt with the flavouring agents. Make up to volume with water and stir until the mixture is completely in solution.

EXAMPLE 23

*Oral suspension*

|   | Percent w./v. |
|---|---|
| Calcium salt of trichloroethyl-phosphate (microfine) | 10 |
| Glycerin | 6 |
| Nipa Combination 82121 | 0.10 |
| Sucrose | 28 |
| Colouring and flavouring as required. |   |
| Water to produce 100 vols. |   |

*Method.*—Triturate the colouring and flavouring agents with the trichloroethyl-phosphate calcium salt. Dissolve the sucrose in an equal volume of water with the aid of heat and boil for 5 minutes. Triturate the mixed powders with the glycerin and add the cooled syrup. Dilute the suspension with water to the required volume and mix well.

EXAMPLE 24

*Oral tablet containing calcium salt of trichloroethylphosphate*

|   | Mg. |
|---|---|
| Calcium salt of trichloroethyl-phosphate (microfine) | 500 |
| Maize starch | 288 |
| Gelatine | 4.0 |
| Tween 80 | 8.0 |

*Method.*—Pass the calcium salt of trichloroethyl-phosphate and 170 mg. of maize starch through a 60 mesh screen and blend the sieved powders. Using 20 mg. starch approximately, prepare a 10% starch paste containing 2% gelatine and 4% Tween 80. Granulate the mixed powders with the starch paste adding a little distilled water if required, to produce a stiff paste. Pass the mass through a 12 mesh screen and dry at 45° C. to constant weight. Pass the dried granules through a 16 mesh screen and mix the "fines" with the magnesium stearate. Blend the granules with the magnesium stearate mix and the remainder of the starch (98 mg.). Compress the blend on ½″ flat bevelled punches at 800 mg. per tablet.

EXAMPLE 25

*Effervescent tablets for oral use*

| (a) Trichloroethyl-phosphate monosodium salt | g | 1.0 |
|---|---|---|
| (b) Sodium bicarbonate | g | 2.0 |
| (c) Polyethyleneglycol 6,000 | mg | 165 |
| (d) Sodium benzoate | mg | 165 |
| (e) Peppermint flavour | ml | 0.15 |

*Method.*—Pass (a) and (b) through a 60 mesh screen and dry the powders to a moisture content not exceeding 0.5%. Blend the sieved powders in an atmosphere of low humidity, and granulate the mix with a 32% solution of (c) in chloroform. Pass the mass through a 12 mesh screen and remove the chloroform by heating at 40–45° C. Check that the moisture content of the dried granules does not exceed 0.5% by weight. Pass the dried granules through a 16 mesh screen and separate off the "fines." Freshly sieve (d) through a 100 mesh screen and mix with the fines. Blend the lubricating mix (into which has been intimately blended the peppermint flavouring) with the granules and compress at 3.330 g. per tablet. Dry the tablets and transfer to predried small unit containers of say 10 or 25 tablets, fitted with a moisture proof closure and containing a drying agent insert, e.g. silica gel bag. Labelling on the container should include directions to add one tablet to ½ a tumblerfull of water. Effervescence will occur and the mixture may be taken as soon as the tablet has dissolved.

EXAMPLE 26

*Alternative formulae for oral tablets*

| (a) | Mg. |
|---|---|
| Trichloroethyl-phosphate monosodium salt | 250.0 |
| Polyvinylpyrrolidone | 12.0 |
| Mannitol | 36.2 |
| Dioctyl sodium sulphosuccinate | 0.3 |
| Magnesium stearate | 1.5 |

| (b) |   |
|---|---|
| Trichloroethyl-phosphate monosodium salt | 250.0 |
| Sorbitol | 245.0 |
| Magnesium stearate | 5.0 |

*Method.*—The Formulae *a* and *b*, given above, may be prepared by conventional tablet methods, each tablet containing 250 mg. or 125 mg. of the active material. The tablets may be sugar-coated or alternatively the tablets may be prepared by a press-coating technique, the outer layer consisting of pleasant tasting, inert material.

EXAMPLE 27

*Children's suppositories*

| | Parts |
|---|---|
| Monosodium salt of trichloroethyl-phosphate | 33.3 |
| "Massupol" suppository base (glyceryl esters mainly of lauric acid with a small percentage of glyceryl monostearate) | 66.7 |

Pass the powder through a 100 mesh sieve. Shred or granulate the base and slowly heat, with stirring, until completely melted. The temperature should not exceed 50° C. Incorporate the sieved powder and refine the suspension by passage through a colloid mill to give a smooth homogeneous mix at 42° C.±2° C. Collect into a jacketed filling vessel fitted with a slow mixing device and maintain the mix at 40° C.±2° C. Fill directly into nominal one gram moulds and transfer to a chilling chamber. Level the base of the suppositories, remove from the moulds and pack into suitable air-tight containers. The suppositories may also be individually wrapped. Each suppository weights 1.5 grams (approximately).

EXAMPLE 28

*Gelatine rectal capsules*

| | Percent w./w. |
|---|---|
| Trichloroethyl-phosphate monosodium salt | 45 |
| Fractionated coconut oil | 49.5 |
| Liquid lecithin (soya type) | 5.5 |

Disperse the liquid lecithin in the oil fraction and incorporate the trichloroethyl phosphate salt, which has been previously dried and passed through a 100 mesh sieve. Refine the suspension by passing through an ointment mill and send the soft paste to a capsule manufacturer for encapsulation in gelatine capsules, so that each capsule contains one gram of the drug (approximately 1.6 ml.).

We claim:

1. A non-toxic compound selected from the group consisting of an acidic ester of the formula $$CX_3 \cdot CH_2 - O - R$$

in which X is a halogen atom selected from the group consisting of chlorine and bromine and R is a member selected from the group consisting of

and

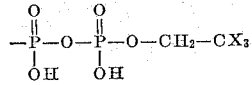

in which X has the same meaning as above and a non-toxic salt thereof.

2. An alkali metal salt of $\beta,\beta,\beta$-trichloroethyl dihydrogen orthophosphate.

3. An alkaline earth metal salt of $\beta,\beta,\beta$-trichloroethyl dihydrogen orthophosphate.

4. An ammonium salt of $\beta,\beta,\beta$-trichlorethyl dihydrogen orthophosphate.

5. Monosodium $\beta,\beta,\beta$-trichloroethyl hydrogen orthophosphate.

References Cited by the Examiner

UNITED STATES PATENTS

| 2,743,232 | 4/1956 | Chance et al. | 260—461 X |
| 2,778,850 | 1/1957 | Barr et al. | 260—485 |
| 2,866,733 | 12/1958 | Lott et al. | 167—52 |
| 2,872,370 | 2/1959 | Berger | 167—52 |
| 2,977,383 | 3/1961 | Perkow | 260—461 |
| 3,062,858 | 11/1962 | Cramer | 260—461 |

OTHER REFERENCES

Jenkins et al.: The Chemistry of Organic Medicinal Products, N.Y., 1943, pp. 118–119.

Kundiger et al.: J. Am. Chem. Soc., vol. 76, 1954, pp. 1381–1382.

Tormey et al.: "Chem. Abst.," vol. 55, col. 9336f, 9337d (May 15, 1961).

CHARLES B. PARKER, *Primary Examiner.*

IRVING MARCUS, JOSEPH P. BRUST, *Examiners.*

FRANK M. SIKORA, R. L. RAYMOND,

*Assistant Examiners.*